H. H. HEISER.
Girth-Iron for Saddles.
No. 212,693.  Patented Feb. 25, 1879.
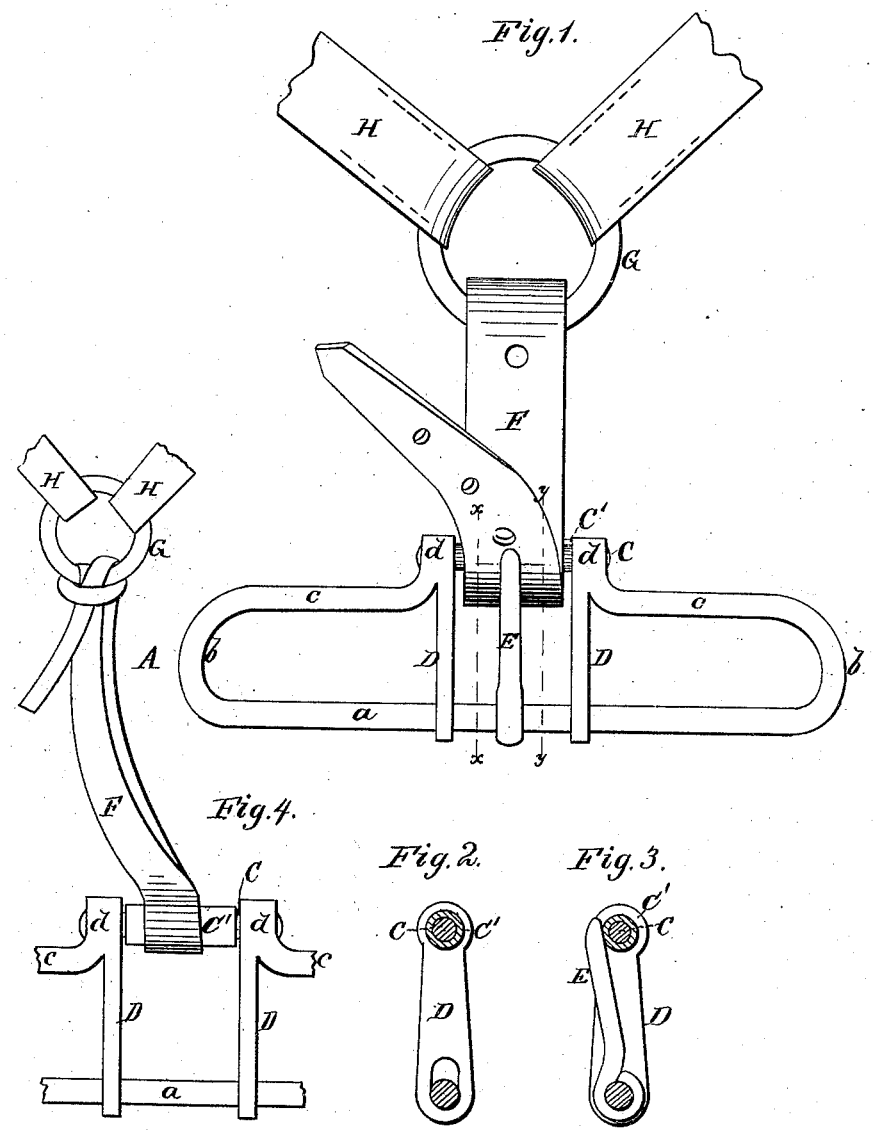
WITNESSES:
Henry N. Miller
C. Sedgwick
INVENTOR:
H. H. Heiser
BY Munn & Co
ATTORNEYS.

UNITED STATES PATENT OFFICE.

HERMANN H. HEISER, OF DENVER, COLORADO.

IMPROVEMENT IN GIRTH-IRONS FOR SADDLES.

Specification forming part of Letters Patent No. 212,693, dated February 25, 1879; application filed December 30, 1878.

*To all whom it may concern:*

Be it known that I, HERMANN H. HEISER, of Denver, in the county of Arapahoe and State of Colorado, have invented a new and useful Improvement in Girth-Irons for Saddles, of which the following is a specification:

The object of this invention is to provide a strong and efficient girth-iron for saddles; and it consists of a metal loop with strengthening-bars and a lacing-bar, with a roller between the strengthening-bars, arranged so as to hold the strap for lacing in its proper position with relation to the girth, and other details of construction, that will be fully described herein.

In the accompanying drawings, Figure 1 is a side view of my improvement with strap-connections. Fig. 2 is a section of the same on line $x\ x$, Fig. 1. Fig. 3 is a section on line $y\ y$ of Fig. 1, and Fig. 4 shows the connection by lacing.

Similar letters of reference indicate corresponding parts.

Referring to the drawings, A represents the girth-iron. It consists of a bar of iron, $a$, bent round at $b\ b$, so as to form parallel parts $c\ c$, and the ends curved toward each other and bent upward, as at $d\ d$. Through these upward-bent ends is passed horizontally a round bar, C, and riveted in place, the same being covered with a solid roller, C', between ends $d\ d$ and strengthening-bars D D.

From the faces of ends $d\ d$ extend, parallel to each other, the strengthening-bars D D, the opposite ends being fixed around the bar $a$. These strengthening-bars can be welded or brazed to the ends $d\ d$ and bar $a$ if the iron is forged out, or else cast in one piece with it when it is made of cast malleable iron. In either case they bind the ends $d\ d$ and bar $a$ firmly together in their respective positions, and hold them in place, so as as to render them capable of resisting any strain that may be put upon lacing-bar and roller C' by strap F.

Between bars D D and bar $a$ is placed a tongue, E, which is used when the fastening is made by buckling, as shown in Fig. 1; but when there is a lace-fastening used the tongue is dispensed with, as shown in Fig. 4.

F is the strap for buckling or lacing, and G is the ring to which it is permanently attached. Ring G is attached to the ends of straps H H, which are depending from the saddle.

The operation of my invention is as follows: When lacing is used the free end of strap F, one end whereof is permanently attached to ring G, is carried under the roller of bar C, and then up again through ring G, and then fastened by a knot, as shown in Fig. 4. When the buckle-fastening is used, the free end of strap F is carried under roller of bar C, thence up again and through ring G, then down again under roller of bar C, and then the tongue E is entered into one of the holes in said strap F, as shown in Fig. 1. In either of these ways a strong connection is made, and the saddle held firmly on the animal.

The strengthening-bars D D hold the iron together, and prevent bending or yielding in the slightest degree, and at the same time they prevent strap F from slipping toward either end of the iron, holding it permanently upon the roller in the middle, and thus preventing any disarrangement of the girth without interfering in the least with the arrangements of the other connections.

The roller C' on lacing-bar C allows strap F to move without friction, thereby assisting in tightening girth quickly, and without the use of much force, at the same time protecting lace-strap F from wear, and also strengthening lacing-bar C.

Having thus described my invention, I claim as new and desire to secure by Letters Patent—

1. The girth-iron A, provided with the lacing-bar C, roller C', and strengthening-bars D D, substantially as herein shown and described.

2. The girth-iron A, provided with the lacing-bar C, roller C', strengthening-bars D D, and tongue E, substantially as herein shown and described.

HERMANN HUGO HEISER.

Witnesses:
ERNST KLOER,
CHARLES RIESSIG.